United States Patent
Watanabe et al.

(10) Patent No.: US 6,285,347 B1
(45) Date of Patent: *Sep. 4, 2001

(54) DIGITAL MAP DISPLAY SCROLLING METHOD, DIGITAL MAP DISPLAY SCROLLING DEVICE, AND STORAGE DEVICE FOR STORING DIGITAL MAP DISPLAY SCROLLING PROGRAM

(75) Inventors: Ryuichi Watanabe, Kanagawa; Masafumi Minami, Tokyo, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,687

(22) Filed: May 26, 1998

(30) Foreign Application Priority Data

May 28, 1997 (JP) .................................... 9-138900

(51) Int. Cl.[7] .................................... G09G 5/34
(52) U.S. Cl. .................... 345/123; 345/121; 345/973; 345/145
(58) Field of Search .................... 345/123, 145, 345/159, 973, 439, 438, 121, 125, 157, 156, 158; 364/188; 701/200, 205, 207, 208, 225; 340/990, 995

(56) References Cited

U.S. PATENT DOCUMENTS

| 4,899,292 | 2/1990 | Montagna et al. ............ 364/521 |
|---|---|---|
| 5,434,591 | * 7/1995 | Goto et al. ................... 345/123 |
| 5,485,174 | 1/1996 | Henshaw et al. ............. 345/123 |
| 5,617,319 | 4/1997 | Arakawa et al. ............ 364/449.1 |
| 5,777,875 | * 7/1998 | Miyano ....................... 364/188 |
| 5,864,330 | * 1/1999 | Haynes ....................... 345/123 |
| 5,872,566 | * 2/1999 | Bates et al. ................ 345/145 X |
| 5,883,619 | * 1/2000 | Ho et al. .................... 345/123 X |
| 6,016,110 | * 1/2000 | Takinami .................... 345/123 X |

FOREIGN PATENT DOCUMENTS 0 595 746 A1   5/1994  (EP) ...................... G06F/3/023

OTHER PUBLICATIONS

J. Rink, "Von A Nach B Mit CD," CT Magazin Fur Computer Technik, Feb. 1997, pp. 176–197.
D. Trudeau et al., "Integrating AM/FM Maps with Distribution Scada," IEEE Transactions on Power Delivery, Apr. 1, 1990, vol. 5, No. 2, pp. 1216–1221, XP000127872.
"Mouse Assisted Scrolling Function for Multimedia Displays," IBM Technical Disclosure Bulletin, Dec. 1, 1994, vol. 37. No. 12, pp. 495–496.
U.S. Application No. 09/087,703, Jun. 1, 1998.

* cited by examiner

Primary Examiner—Matthew Luu
Assistant Examiner—Chante' Harrison
(74) Attorney, Agent, or Firm—Oblon, Spivak, McClelland, Maier & Neustadt, P.C.

(57) ABSTRACT

A digital map display scrolling method is provided which is for successively scrolling a displayed portion of a digital map as map information in digital form within a display screen, the method comprising the steps of displaying the displayed portion of the digital map at the display screen, shifting a pointer within the displayed portion of the digital map displayed at the display screen, and making an amount by which the pointer positioned at the displayed portion is shifted correspond to the scrolling speed of the displayed portion of the digital map within the display screen.

13 Claims, 10 Drawing Sheets

FIG.6A  FIG.6B (FAST)  (SLOW)

DIGITAL MAP DISPLAY SCROLLING METHOD, DIGITAL MAP DISPLAY SCROLLING DEVICE, AND STORAGE DEVICE FOR STORING DIGITAL MAP DISPLAY SCROLLING PROGRAM

BACKGROUND OF THE INVENTION

The present invention relates to a digital map display scrolling method, a digital map display scrolling device and a storage medium for storing a digital map display scrolling program which are for scrolling a displayed portion of a digital map as map information in digital form within a display screen.

Digital maps as map information in digital form are maps put into electronic form so as to be handled on the display screen of a computer such as a portable computer etc. This kind of digital map is referred to as an electronic map or map software, where maps can be displayed on a display screen.

With this kind of digital map, a map is displayed on, for example, the display screen of a portable computer so that such an operation that a target is set on the map can be carried out, with these digital maps being applied to car navigation systems etc. in recent years.

Incidentally, when a displayed portion of the digital map of the related art is scrolled with this displayed portion displayed at the display screen so as to bring around a displayed portion for the place the user wishes to see, the digital map displayed portion is scrolled a little by little in a so-called "hand scrolling" using hand-shaped icon (button), referred to as a "grabber hand".

In digital map scrolling in this kind of hand scrolling situation, it is necessary to shift the position of the grabber hand once within the display screen and then repeat similar operations to scroll through the displayed portion. Namely, in such a scrolling method of the displayed portion employing a grabber hand, only a discontinuous hand scrolling of the displayed portion is possible.

It is therefore impossible to continuously scroll the displayed portion of the digital map with the digital map in related art. In addition, the scrolling of the displayed portion by the discontinuous hand scrolling can only be carried out at a fixed speed.

Accordingly, it is an object of the present invention to provide a digital map display scrolling method, a digital map display scrolling device, and a storage medium for storing a digital map display scrolling program which enable continuous scrolling of a displayed portion of a digital map at an arbitrary speed by solving the above problems.

SUMMARY OF THE INVENTION

The above object is therefore achieved in the present invention by a digital map display scrolling method for successively scrolling a displayed portion of a digital map as map information in digital form within a display screen, the method comprising the steps of displaying the displayed portion of the digital map at the display screen, shifting a pointer within the displayed portion of the digital map displayed at the display screen, and making an amount by which the pointer positioned at the displayed portion is shifted correspond to a scrolling speed of the displayed portion of the digital map within the display screen.

In this scrolling method, an amount by which the pointer positioned at the displayed portion is shifted by the user is made to correspond to a scrolling speed of the displayed portion of the digital map at the display screen when the displayed portion of the digital map is to be continuously scrolled within the display screen.

This enables free setting of the scrolling speed of the displayed portion of the digital map if the user determines the amount by which the pointer is shifted. The user can then instantly display the desired displayed portion of the digital map at the display screen.

In this scrolling method, if the magnitude of the scrolling speed of the displayed portion of the digital map can be preferably displayed by the length of an arrow forming a pointer, the user can estimate the scrolling speed of the displayed portion of the digital map by confirming the length of the arrow of the pointer.

Further, in this method, a scrolling direction and a scrolling speed of the displayed portion of the digital map can be preferably displayed as a result of arithmetic operations in the vicinity of the pointer at the display screen. The user can then be ensured to visually recognize the scrolling direction and scrolling speed of the displayed portion within the display screen.

The above object can be achieved in the present invention with a digital map display scrolling device for successively scrolling a displayed portion of a digital map as map information in digital form within a display screen, the display scrolling device comprising a display device having a display screen for displaying the displayed portion of the digital map, a pointing device for pointing and shifting the pointer, the pointing device being operated for pointing and shifting the pointer within the displayed portion of the digital map displayed at the display screen of the display device and an arithmetic processing device for carrying out arithmetic processing for making an amount by which the pointer is shifted within the displayed portion of the digital map due to operations of the pointing device correspond to a scrolling speed of the displayed portion of the digital map within the display screen.

In this display scrolling device, the displayed portion of the digital map is displayed at the display screen of the display device. The pointing device is used while the user is shifting the pointer within the displayed portion of the digital map displayed at the display screen of the display means.

The arithmetic processing device carries out arithmetic processing to make the amount by which the pointer is shifted within the displayed portion of the digital map due to operations of the pointing device by the user correspond to a scrolling speed of the displayed portion of the digital map within the display screen.

This enables free setting of the scrolling speed of the displayed portion of the digital map if the amount by which the pointer is shifted is determined by the user. The user can then immediately display the desired displayed portion of the digital map within the display screen.

In the present invention, the above object can be achieved with a storage medium for storing a digital map display scrolling program for successively scrolling a displayed portion of a digital map as map information in digital form within a display screen, the program comprising the steps of displaying the displayed portion of the digital map at the display screen, shifting a pointer in accordance with operation of a pointing device within the displayed portion of the digital map displayed at the display screen, and making an amount by which the pointer is shifted within the displayed portion of the digital map correspond to a scrolling speed of the displayed portion of the digital map within the display screen.

In this medium, an amount by which the pointer positioned at the displayed portion is shifted by the user is made to correspond to a scrolling speed of the displayed portion of the digital map at the display screen when the displayed portion of the digital map is to be continually scrolled within the display screen.

This enables free setting of the scrolling speed of the displayed portion of the digital map if the user determines the amount by which the pointer is shifted. The user can then instantly display the desired displayed portion of the digital map at the display screen.

DESCRIPTION OF THE PREFERRED EMBODIMENTS

In the following a preferred embodiment of the present invention will be described in detail on the basis of the attached drawings.

The embodiment described in the following is a specific preferred example of the present invention and is thereby subject to various technical limitations. However, the scope of the present invention is by no means limited to these forms in the following explanation unless otherwise described to limit the present invention.

Figure 1:
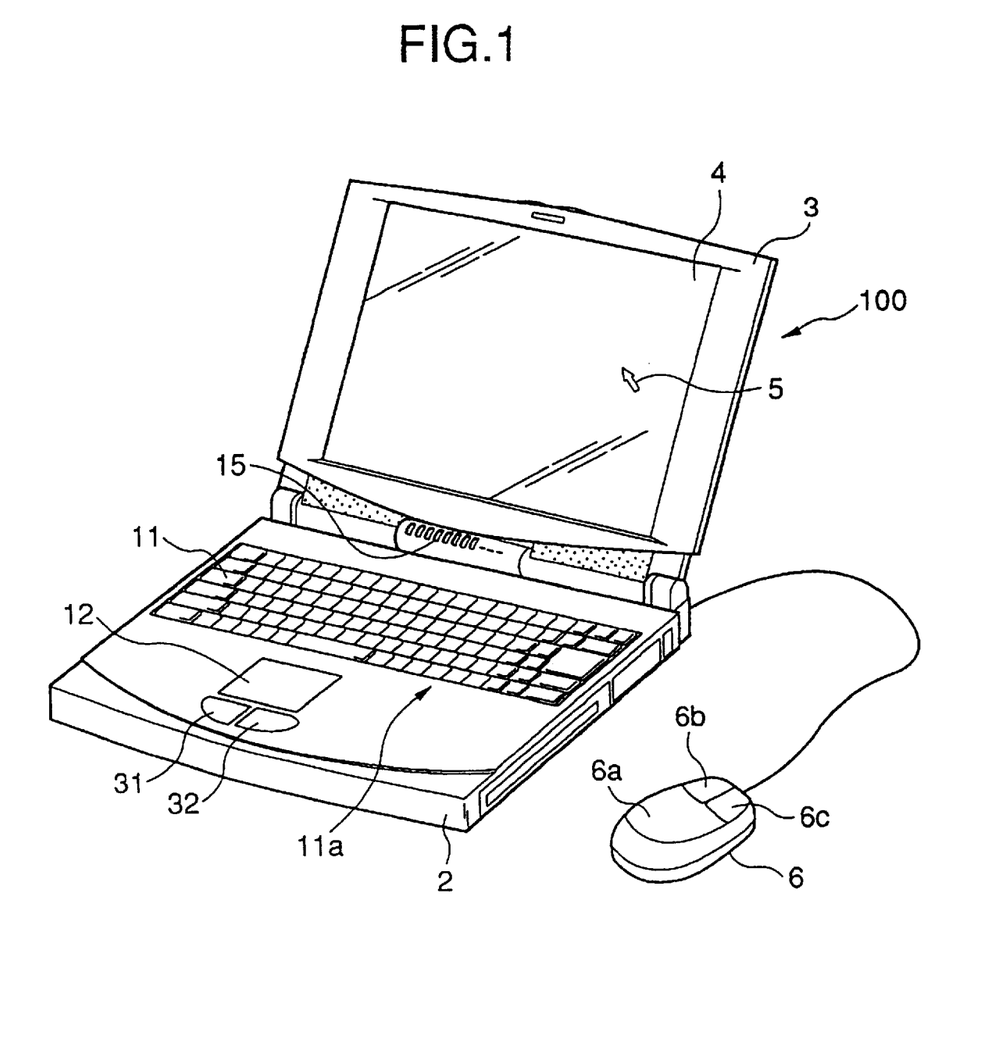
FIG. 1 is a perspective view showing a compact notebook personal computer as an embodiment of a digital map scrolling device of the present invention.

FIG. 1 is a perspective view showing a preferred embodiment of a digital map scrolling device 100 of the present invention. A system configuration for this digital map display scrolling device 100 is shown in FIG. 2.

The digital map display scrolling device 100 of FIG. 1 is a so-called portable notebook personal computer which has a main body 2, display means 3, a mouse 6, a touch pad 12 and touch pads 31 and 32 etc. The display means 3 has a display screen 4 to which, for example, a Liquid Crystal Display (LCD) can be adopted. The display means 3 is attached to the main body 2 in such a manner as to be capable of being opened and closed.

The main body 2 has the aforementioned mouse 6, touch pads 12, 31 and 32 and a keyboard 11 as pointing means, and a power supply lamp 15 etc. The mouse 6 is a device that is slid on a desk to point specific portions of the display screen.

Figure 2:
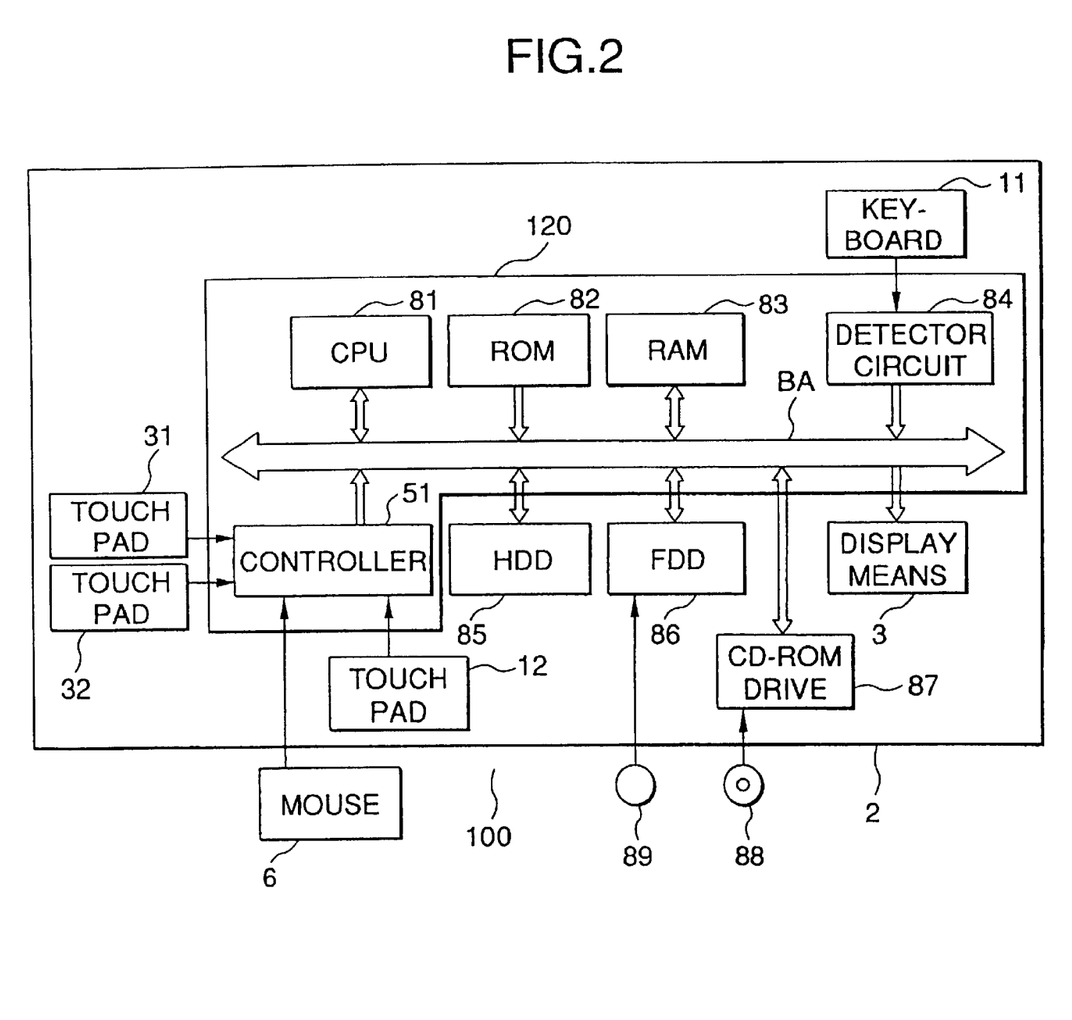
FIG. 2 is a block diagram showing a system for the digital map scrolling device of FIG. 1.

FIG. 2 is a block diagram showing the system configuration within the main body 2 and the display means 3.

The main body 2 has a floppy disc drive (FDD) 86, a CD-ROM (read-only memory utilizing a compact disc) drive 87, a detector circuit 84 for a keyboard 11, a CPU (central processing unit) 81, a ROM (read-only memory) 82, a RAM (random access memory) 83 and a controller 51.

Touch pads 12, 31, 32 and a mouse 6 are connected to the controller 51. The controller 51, the ROM 82, the RAM 83, the detector circuit 84, the hard disc drive 85, the floppy disc drive 86 and the CD-ROM drive 87 are connected to CPU 81 via a bus BA.

The mouse 6 of FIG. 1 has a mouse body 6a, a left button 6b and a right button 6c. The touch pad 31 with a function similar to that of the left button and the touch pad 32 with a function similar to that of the right button are provided below the touch pad 12.

The CPU 81 of FIG. 2 executes various processings in accordance with a program stored at the ROM 82. The data and programs etc. necessary for the CPU 81 to execute various processes are stored in an appropriate manner at the RAM 83. The detector circuit 84 detects operation of the keyboard 11 and outputs a detection signal to the CPU 81.

The hard disc drive (HDD) 85 stores programs processed by the CPU 81 and data etc. in an appropriate manner. The floppy disc drive (FD) 86 records and plays back data to and from a floppy disc 89 installed therein.

The controller 51 detects operations of the touch pad 12 (first touch pad), the touch pads 31 and 32 (second touch pad) and the mouse 6 and outputs a detection signal to the CPU 81.

When the user shifts a pointer 5 using the touch pads 12, 31 and 32, the user touches (presses) a prescribed position on the touch pad 12 with their finger, and shifts this touching position in the direction that the pointer 5 is to be shifted. The controller 51 detects this operation, i.e. when the user applies a pressure to the touch pad 12 with their finger, the electrostatic capacity of the position being pressed changes. For example, when a certain position on the touch pad 12 is pressed by a finger, the electrostatic capacitance between a horizontal electrode and a vertical electrode changes largely compared to the electrostatic capacitance between other electrodes.

When a key of the keyboard 11 is operated, the detector circuit 84 outputs a detection signal corresponding to this operation to the CPU 81. The CPU 81 then generates, for example, prescribed character data in accordance with this inputted detection signal with this character data being outputted to the display screen 4 and displayed. In a similar manner, the CPU 81 reads out graphics data for the pointer 5 stored in the ROM 82 and outputs this data to the display screen 4 for displaying. In this way, the pointer 5 is displayed as shown, for example, in FIG. 1.

The controller 51, CPU 81, ROM 82, RAM 83 and detector circuit 84 in FIG. 2 comprise arithmetic processing means 120. The arithmetic processing means 120 is a section having a function for making an amount of shift of a pointer moved within the displayed portion of a digital map to be described later correspond to scrolling speed of a displayed portion of the digital map within the display screen as a result of operations of the mouse or the touch pads 12, 31 and 32 as the pointing means.

The program for the digital map display scrolling method of this embodiment of the present invention is operated by an operating system such as, for example, Windows' 95 of the Microsoft Corporation in U.S., and is stored, for example, on a CD-ROM 88. The digital map display scrolling program on the CD-ROM 88 can therefore be put onto the hard disc drive 85 by inserting this CD-ROM 88 into the CD-ROM drive 87. The "operating system" (OS) is a software with functions such as "application execution" and "file management" that form the basis for using the computer.

Alternatively, such digital map display scrolling program can be stored on a floppy disc 89 instead of a CD-ROM 88. When this floppy disc 89 is inserted into the floppy disc drive 86, the digital map display scrolling program within this floppy disc 89 is put onto the hard disc drive 85.

Alternatively, the digital map scrolling program can be put onto the hard disc drive 85 via a network such as the internet.

Figure 3:
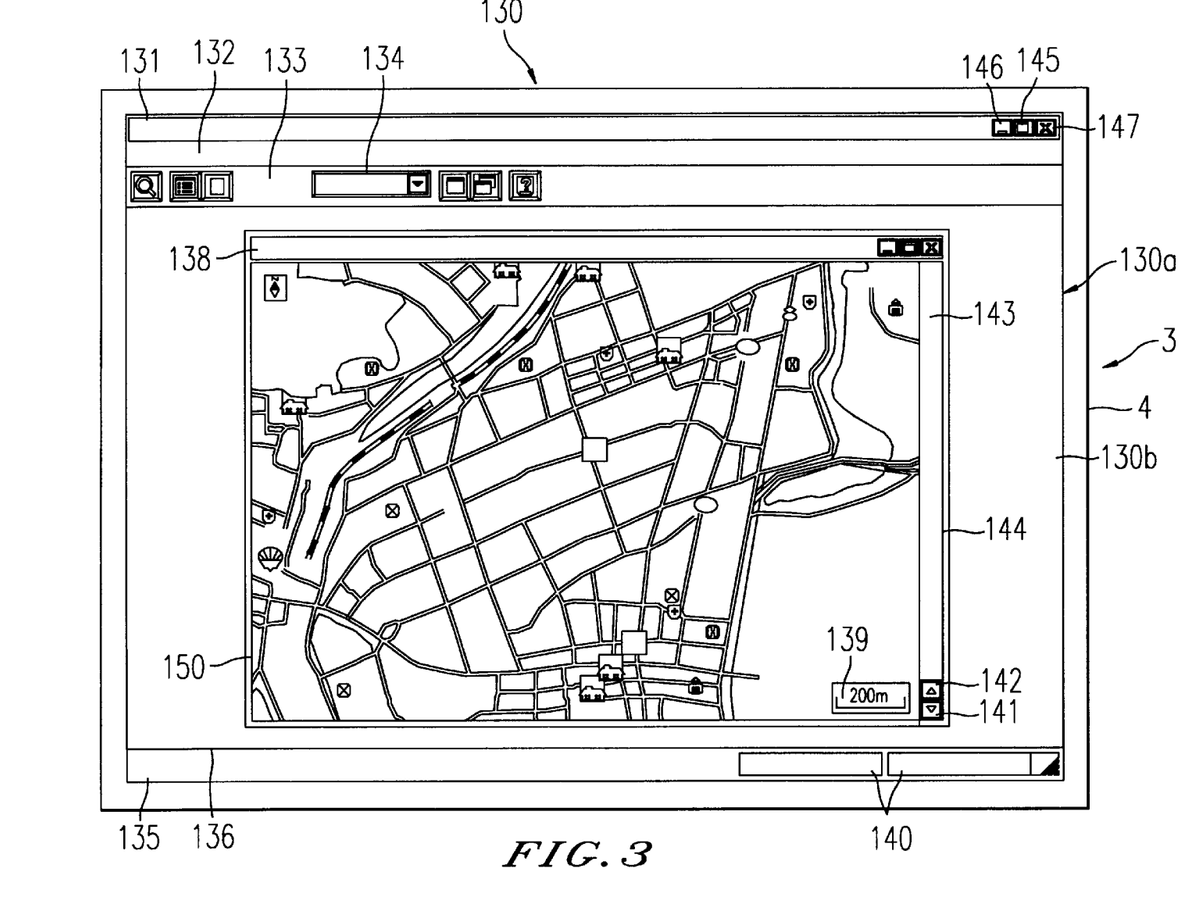
FIG. 3 is a view showing an example of a displayed portion of a digital map displayed on the display screen of the compact notebook personal computer of FIG. 1.

Next, FIG. 3 shows an image 130 included in a digital map display scrolling program displayed on the display screen 4 of the display means 3 of FIG. 1 and FIG. 2. Although this image 130 is simply an example, a title bar 131, a menu bar 132, a tool bar 133, a (information display) list box 134, a guidance area 135, a map display region 136, a map window title bar 138, a scale display 139, a latitude/longitude display 140, a (zoom in) button 141, a (zoom out) button 142, a scale bar 143, a scale bar knob (also referred to as "slider") 144, a maximizing button 145, a minimizing button 146 and an X button (close button) 147 etc. are displayed within this image 130. A separate window 130b is displayed within a window 130a of the image 130. An example of a displayed portion 150 of the digital map 150 is displayed within this window 130b. The menu bar 132 is positioned below the title bar 131 and is lined up with function names, and when clicking is performed with the pointer 5 being positioned at this menu bar 132, a more detailed display is presented. The term "clicking" means an operation of quickly pressing and releasing the mouse button.

Figure 4:
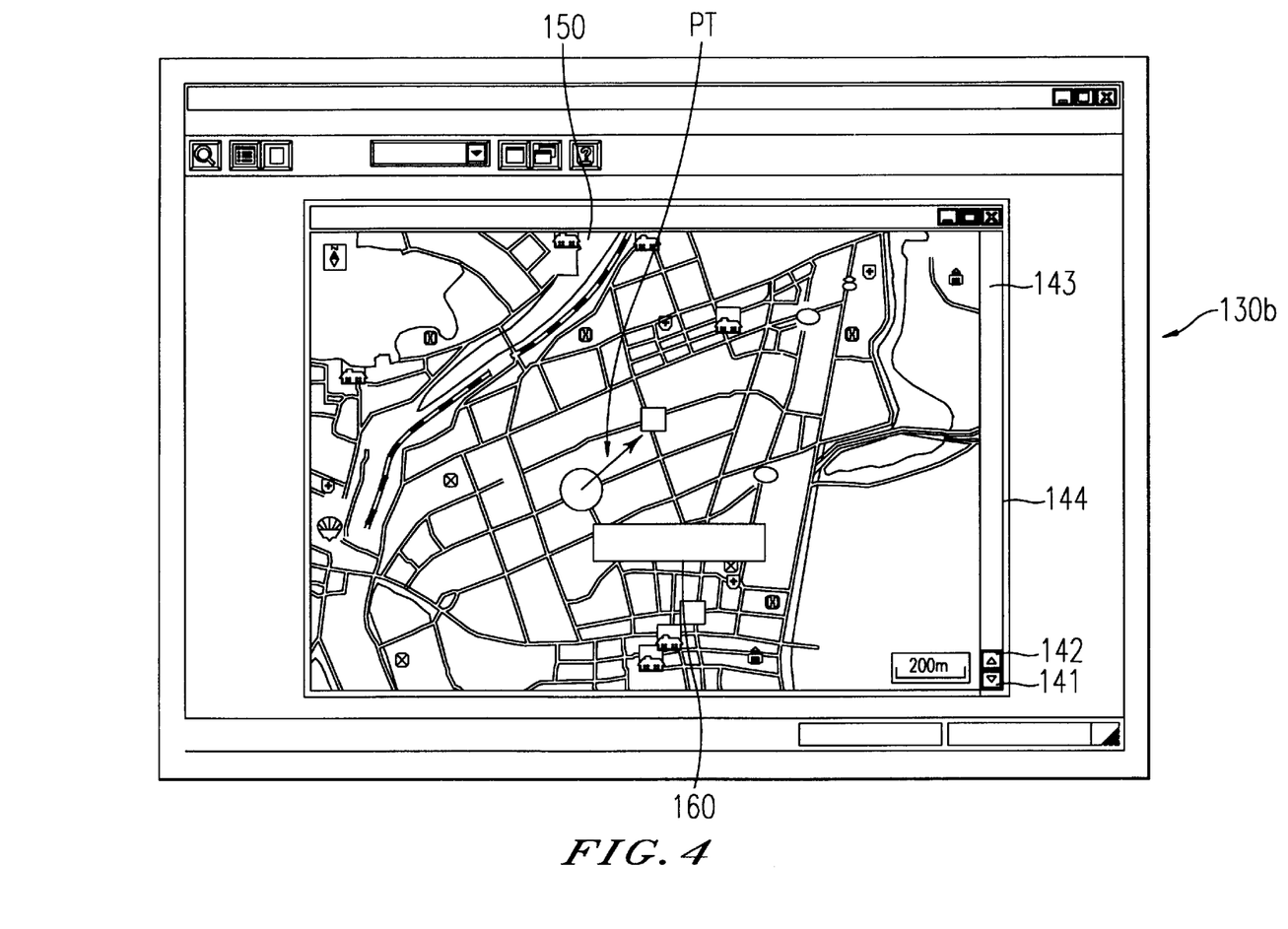
FIG. 4 is a view showing an example of a pointer and an information display part displayed on the displayed portion of a digital map of FIG. 3.

FIG. 4 shows the window 130b of FIG. 3. A pointer PT and an information display part 160 are displayed within the displayed portion 150 of the digital map within this window 130b. This information display part 160 can be arbitrarily displayed in the vicinity of the pointer PT. The term "window" means a displayed portion surrounded by a frame like a window that opens on the computer screen.

The pointer PT will now be described. The pointer PT is a transformation of the arrow-type pointer 5 shown in FIG. 1. That is, the CPU 81 converts the normal arrow-shaped pointer 5 shown in FIG. 1 to a special-shaped pointer PT shown in FIG. 4 and FIG. 5 in accordance with the digital map display scrolling program stored on, for example, the CD-ROM 88 as a result of the left button 6b of FIG. 1 being clicked.

An example of the shape of this pointer PT will now be described with reference to FIG. 5. The pointer PT has a circular portion 153 and an arrow portion 154. The arrow portion 154 has a straight portion 155 and a triangular portion 156. A scroll (shift) direction of the displayed portion 150 of the digital map can be given by the direction of the straight portion 155 toward arrow portion 154 inclined at an angle θ (0 degree to 360 degrees) to the North (N) in the displayed portion 150 of the digital map of FIG. 4.

Moreover, a length L from a center 157 of the circular portion 153 including this straight portion 155 and the triangular portion 156 visually expresses the scrolling speed of the displayed portion 150 of the digital map i.e. the magnitude of the scrolling speed of the displayed portion 150 of the digital map can be displayed as the length L of the arrow portion 154.

The information display part 160 displays the speed X Km/h of the displayed portion 150 of the digital map represented by this pointer PT and the direction (angle) of the arrow portion 154 θ to the north (N).

Figure 6A:
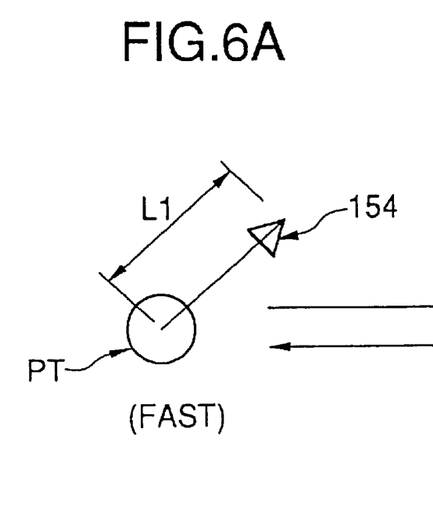
FIGS. 6A and 6B are views showing the pointers of FIG. 5 for fast and slow scrolling speeds of the displayed portion, respectively.
Figure 6B:
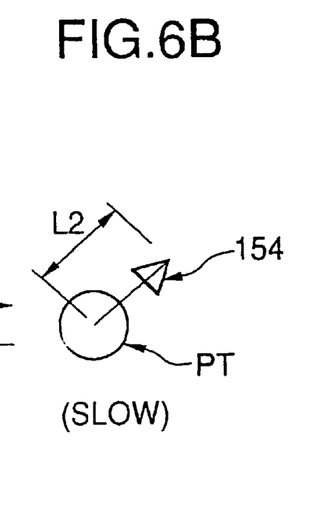

FIG. 6A shows an example of the pointer PT from the case where the scrolling speed of the displayed portion 150 of the digital map of FIG. 4 is high and the length L1 of the arrow portion 154 becomes large. Contrary to this, a length L2 of the arrow portion 154 of the pointer PT shown in FIG. 6B is set to be shorter than the length L1 of FIG. 6A. This shows that the speed expressed by the pointer PT of FIG. 6B is slower than the speed expressed by the pointer PT of FIG. 6A.

Figure 7:
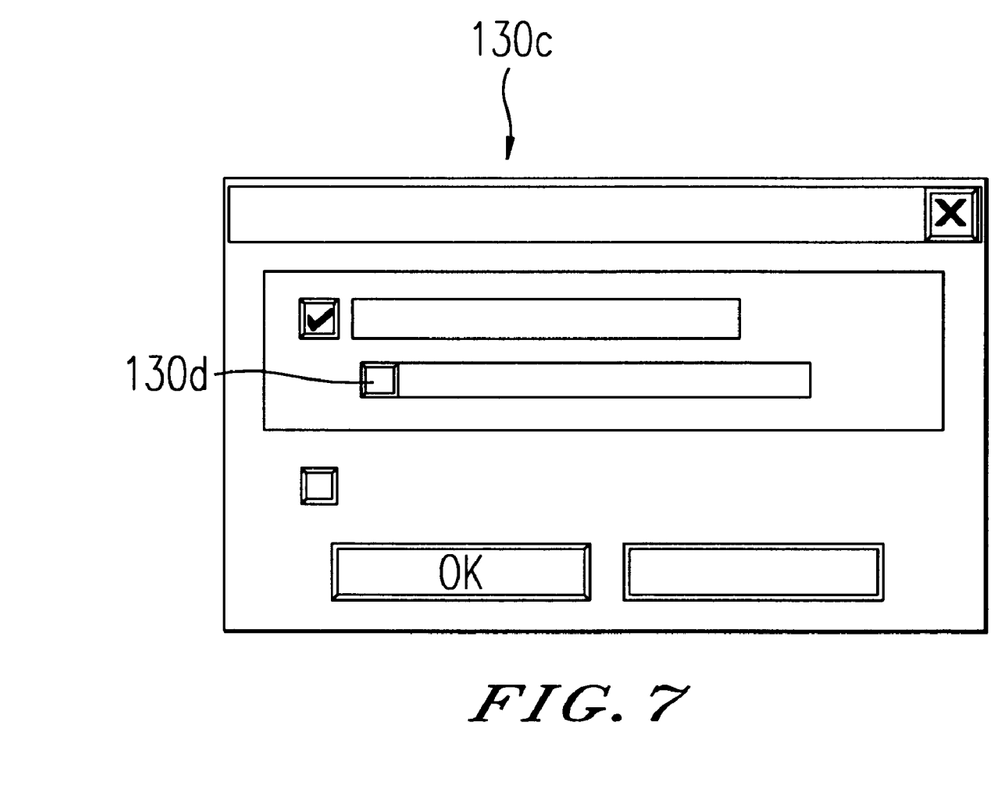
FIG. 7 is a view showing an example of a dialog box for displaying the information display part of FIG. 5.

FIG. 7 shows a dialog box 130c for setting environment that can be displayed in the window 130a of FIG. 3. By performing clicking with the normal pointer 5 being positioned at the portion 130d in this dialog box 130 for displaying speed and direction information, the information display part 160 can be displayed as desired in the vicinity of the pointer PT as shown in FIG. 4 and FIG. 5.

Figure 8:
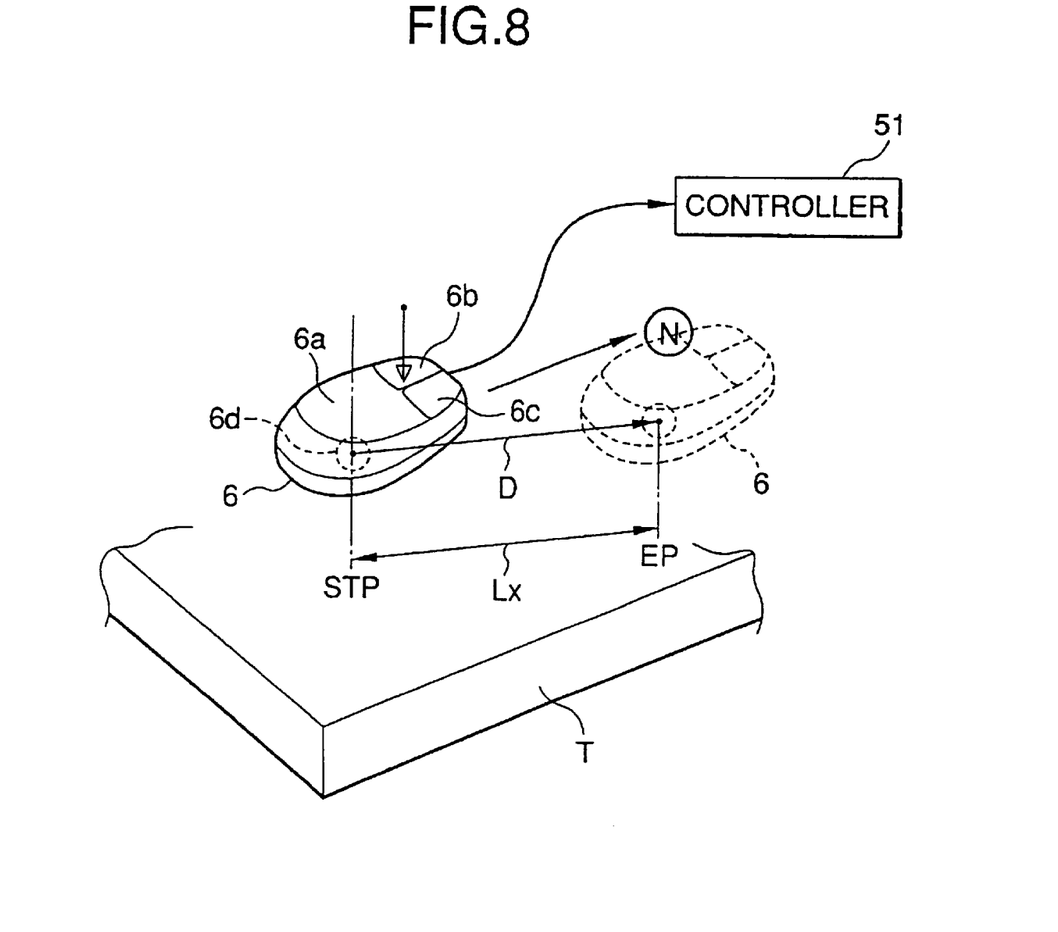
FIG. 8 is a perspective view showing an example of mouse operation.

FIG. 8 shows the mouse 6 of FIG. 1 again. With the mouse 6, setting can be carried out as to the direction of the arrow portion 154 of the pointer PT shown in FIG. 5 and the speed represented by the pointer PT. A "mouse" is a device that is slid on a desk to point specific portions of a screen.

Let the mouse 6 be shifted in the desired direction D from a state shown by solid lines to a state shown by dashed lines with the left button 6b of the mouse 6 of FIG. 8 held pressed by a finger of the user, i.e. a drag operation is carried out using the mouse 6. In this way, a ball 6d of the mouse 6 goes from a start point STP to an end point EP. A distance LX relating to the desired direction D from the start point STP to the end point EP then corresponds to the length of an arrow portion 154 of the pointer PT shown in FIG. 4 and FIG. 5. If the length LX relating to the desired direction D is long, the scrolling speed in the direction of the arrow portion 154 of the displayed portion 150 of the digital map of FIG. 4 is made fast, as shown in FIG. 6A. Conversely, if the length LX is small, the speed of the displayed portion 150 of the digital map with regards to the direction of the arrow portion 154 of the pointer PT is made small.

The desired direction D can be set as an angle of the arrow portion 154 of the pointer PT to the north (N) by shifting the mouse 6 in the desired direction D.

Such simulation of the scrolling speed and direction of the displayed portion 150 of the digital map is carried out by the arithmetic processing means 120, particularly by the CPU 81 thereof.

The setting of the direction of the arrow portion 154 of the pointer PT can be carried out using the cursor key 11, but the shifting speed of the displayed portion 150 at this time cannot be adjusted.

Next, an example of the operation of scrolling the displayed portion 150 of the digital map of FIG. 4 in accordance with a digital map display scrolling program (scrolling operation example) will be described with reference to FIG. 9.

Figure 9:
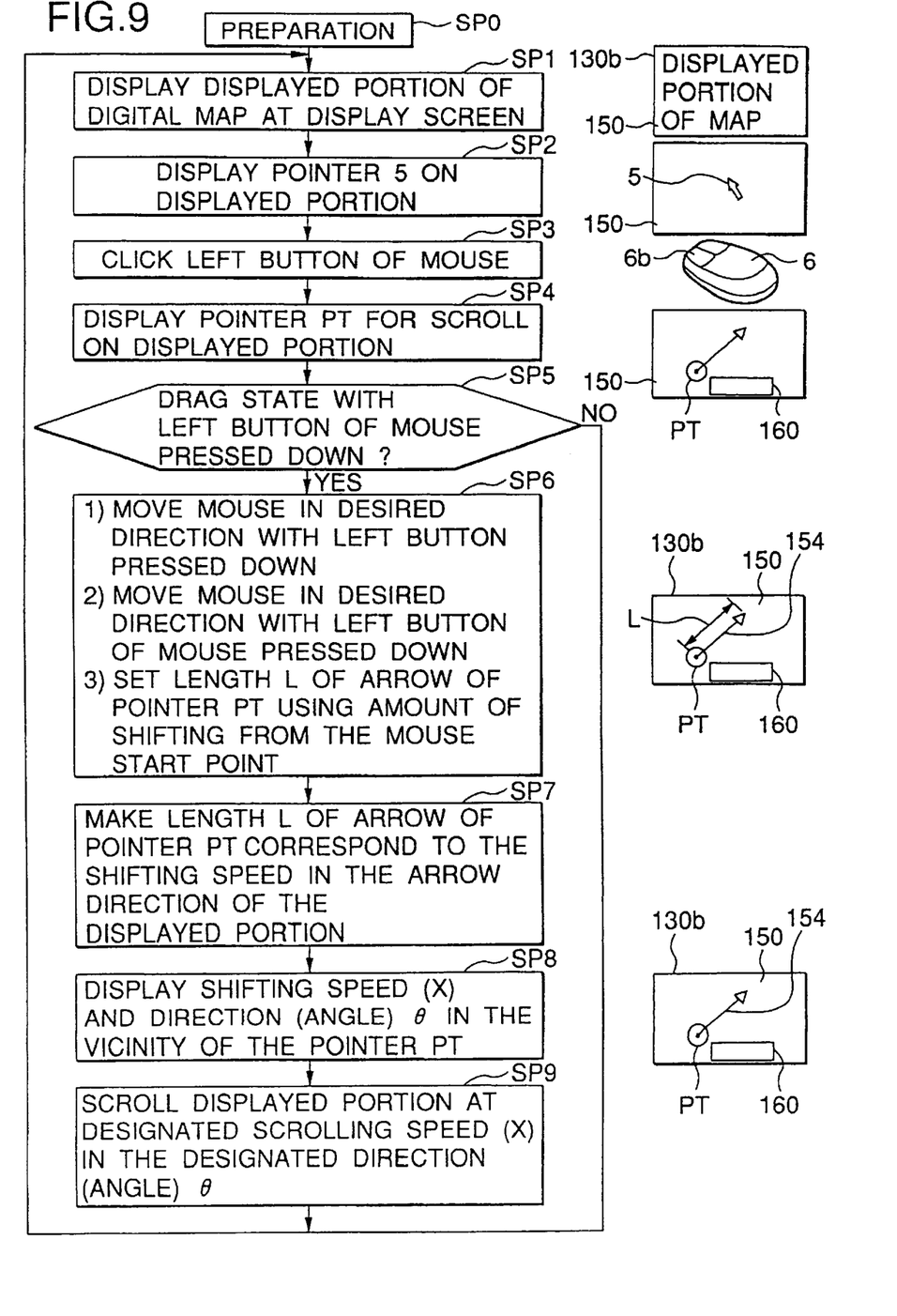
FIG. 9 is a flow chart for an example of an operation for shifting (scrolling) the displayed portion of the digital map on the basis of the digital map display scrolling program of the present invention.

First, in step SP0 of FIG. 9, a CD-ROM 88 is inserted into, for example, the CD-ROM drive 87 of FIG. 2. Alternatively, a floppy disc 89 can be inserted into the floppy disc drive 86.

In this way, a preferred embodiment of the digital map display scrolling program of the present invention stored on the CD-ROM 88 or the floppy disc 89 can be put onto a hard disc 2 of the hard disc drive via the bus BA.

When these preparations are completed, the window 130b is displayed at the display screen 4 of the display means 3 of FIG. 3. This window 130b is a window of the digital map. FIG. 4 only shows this window 130b, with the displayed portion 150 of the digital map of the window 130b of FIG. 4 being displayed as in step SP1.

It is of course possible to allot the shift key or control key as a turbo key and, when the cursor key 11a is operated, increase the scrolling speed of the displayed portion 150 by pressing this turbo key simultaneously with the cursor key 11a or gradually increase the scrolling speed with this turbo key being continuously pressed down.

In step SP2, the arrow-shaped pointer 5 shown in FIG. 1 is displayed on the displayed portion 150.

In step SP3, the user clicks the left button 6b of the mouse 6 of FIG. 8. As a result, the arrow-type pointer 5 of FIG. 1 is changed over to a pointer PT for scrolling (shifting) the displayed portion 150 shown in FIG. 4 and FIG. 5, with this pointer PT being displayed on the displayed portion 150 (step SP4). At the same time, an information display part 160 is displayed in the neighborhood of the pointer PT.

In step SP5 of FIG. 9, a determination is made as to whether or not the mouse 6 is in a drag state with the right button 6b pressed down. When this is determined to be affirmative, the process proceeds to the next step SP6 and when this is determined to be negative, the original pointer shape is restored before the process returns to step SP1. Next, in step SP7, the user shifts the mouse 6 on the table T along the desired direction D with the left button 6b of the mouse 6 of FIG. 5 pressed down. By moving the mouse 6 in the desired direction D with the left button 6b of the mouse 6 pressed down, the length L of the arrow portion 154 of the pointer PT shown in FIG. 6 is set according to the amount of shift of the mouse 6 from the start point STP.

Figure 5:
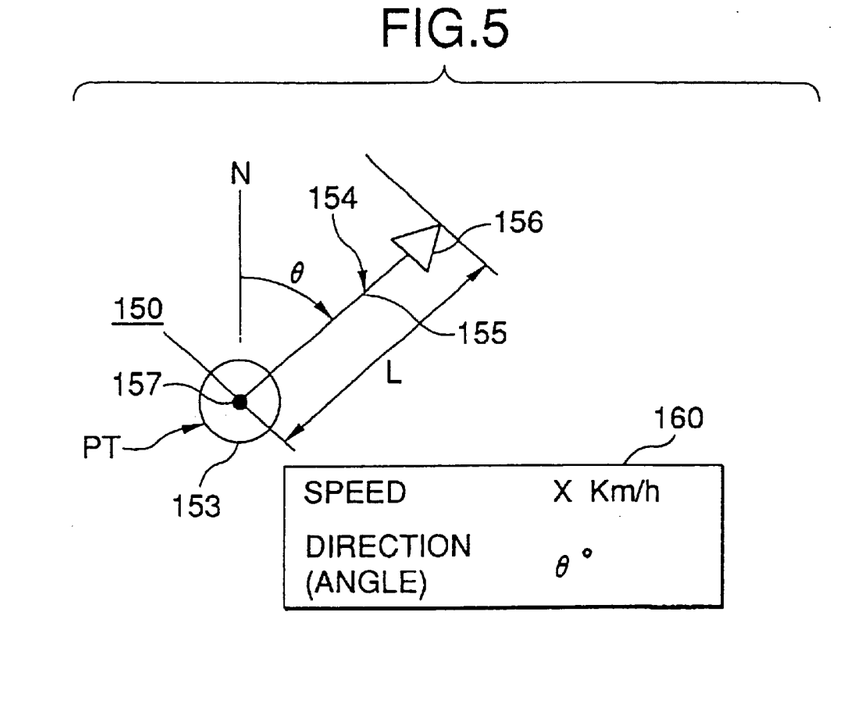
FIG. 5 is a view showing an example of the pointer displayed with the information display part in FIG. 4.

As a result, as shown in FIG. 4 and FIG. 5, the displayed portion 150 of the digital map can be continuously shifted (scrolled) in an oblique direction upward toward the right in the drawings at a scrolling speed corresponding to the length L of the pointer PT. The direction with respect to the north (N) of the arrow portion 154 is shown as the scrolling direction of the displayed portion 150.

In step SP8, the information display part 160 is displayed in the vicinity of the scroll pointer PT. In this information display part 160, the scrolling speed (X) of the displayed portion 150 and the direction of scrolling (angle θ) at the present time can be shown as the results of simulation.

The user is then able to easily know visually the scrolling direction and the scrolling speed of the displayed portion 150 of the digital map. the displayed portion 150 is then scroll processed in step SP9 at the designated scrolling speed (X) in the scrolling direction (angle θ), whereby the user can continuously scroll the displayed portion 150 to reach desired map region.

Figure 10:
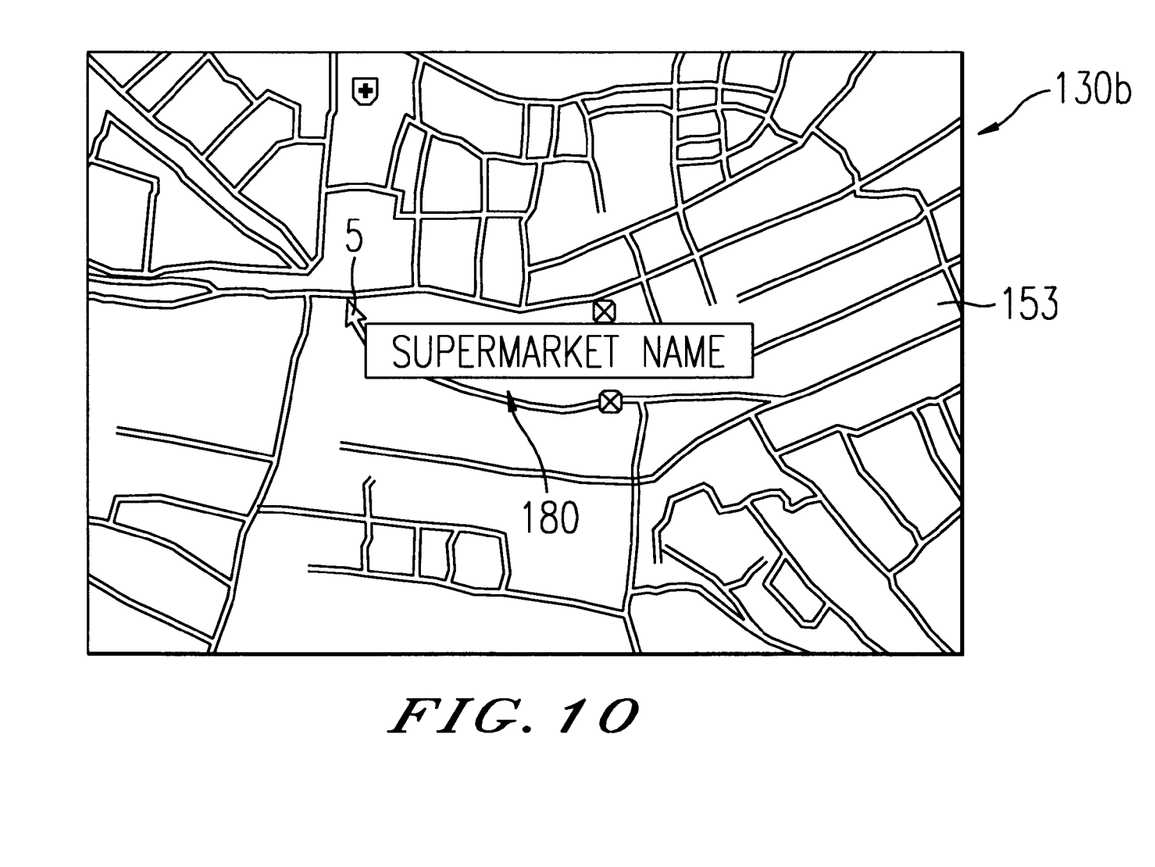
FIG. 10 is a view showing a title of an information icon on a map displayed by a pop-up display part on a displayed portion of a digital map.

Incidentally, FIG. 10 shows an example of a displayed portion 159 of a digital map different from that of FIG. 4. A pop-up display part 180 is displayed on the displayed portion 159 of a digital map. If the normal arrow-type pointer 5 is put on an information icon on the displayed portion 159 of the digital map, the title of the information icon is displayed in a hop-up display part 180. In this pop-up display part 180, there can be displayed various kinds of information corresponding to the information icons on the map such as supermarket names, convenience store names or gas station names.

Figure 11:
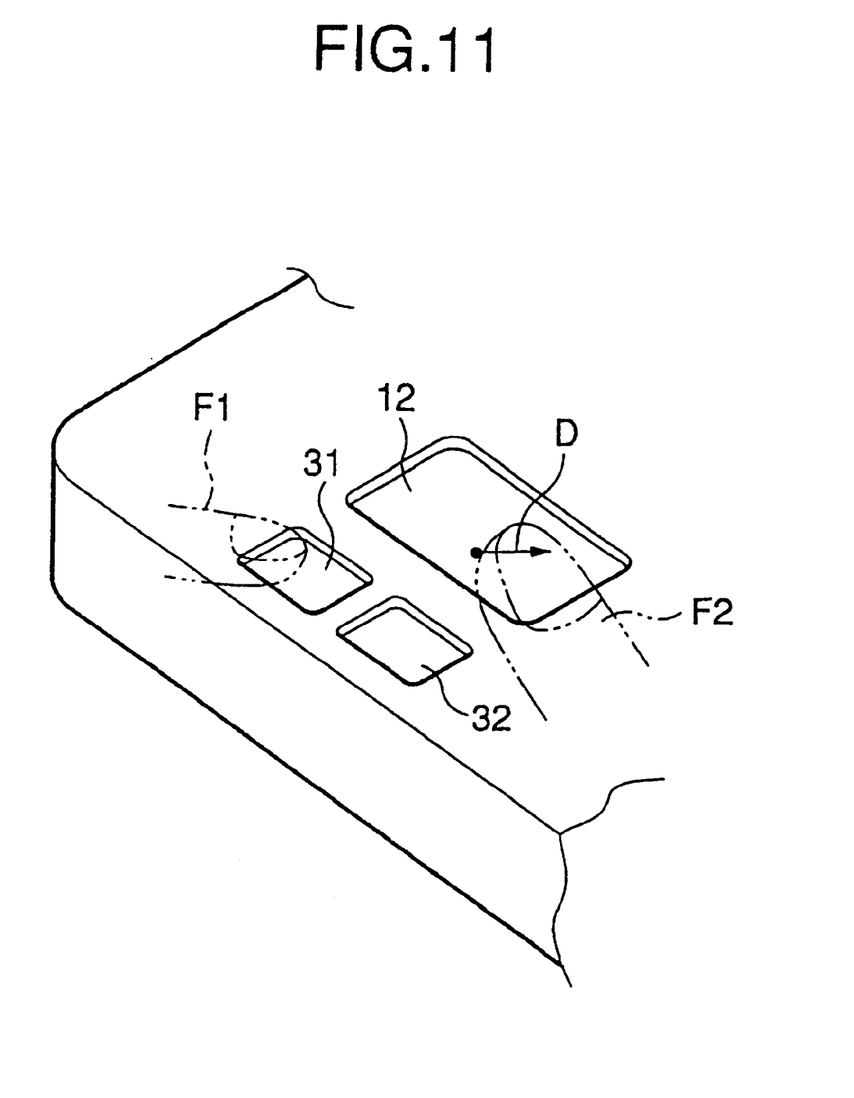
FIG. 11 is a view showing an example of operating touch pads as pointer shifting means of the compact notebook personal computer of FIG. 1.

FIG. 11 also shows an example of setting the shifting direction and the scrolling speed of the pointer PT of FIG. 4 and FIG. 5 using the touch pads 12, 31 and 32 already shown in FIG. 1 instead of operating the mouse 6 of FIG. 8. The touch pads 12, 31 and 32 therefore constitute the pointing means in place of the mouse 6.

As an example of operation, while one of the fingers F1 of the user is being held in contact with the left side touch pad 31, another finger F2 of the user is shifted in a desired direction D on the central large touch pad 12, whereby the length L of the arrow portion 154 of the pointer PT of FIG. 4 and FIG. 5 can then be set according to the amount of the shift and the scrolling direction can also be set. The displayed portion 150 of the digital map shown in FIG. 4 can then be scrolled at a scrolling speed corresponding to the length L of the arrow portion 154.

The present invention is by no means limited to the above embodiment.

In the above embodiment, an example is shown where the digital map display scrolling program of the present invention is stored on the CD-ROM 88 or the floppy disc 89 shown in FIG. 1. However, the present invention is by no means limited in this respect, and this digital map display scrolling program can also be stored so as to be installed on a hard disc of the hard disc drive 85 beforehand. Alternatively, the digital map display scrolling program can be stored on, for example, the hard disc 85 of the hard disc drive via an external network such as the internet.

As a storage medium, another kind of disc such as, for example, a high-density recording disc (DVD) can also be used.

The digital map display scrolling device of FIG. 1 is provided as a compact notebook personal computer, but the present invention is not limited in this respect, and can also be applied to desktop personal computers, navigation systems mounted on moving vehicles such as cars and to portable navigation systems.

The shape of the pointer PT shown in FIG. 4 and FIG. 5 is also by no means limited to that described and other shapes are also possible provided that they are capable of setting the length for expressing the scrolling speed and indicating the direction for scrolling. In addition, the present invention includes the case where the length of the arrow of the pointer is proportional to the scroll (shifting) speed and the case where the length of the arrow is nonlinear with the scroll speed.

Moreover, a speed X Km/h for scrolling the displayed portion 150 of the digital map expressed by the pointer PT and the scrolling direction expressed by the angle θ of the arrow portion 154 to the north (N) are made to be displayed on the information display part 160 shown in FIG. 4 and FIG. 5. However, in place of this, it is possible to display information such as address, postal code number, and place name about a point at which the pointer PT positions and which is a position of a cursor currently being moved. The information about a point is also possible to be displayed together with the speed and direction.

As described above, according to the present invention, scrolling of a digital map displayed portion can be carried out at an arbitrary speed while continuously scrolling a displayed portion of a digital map.

What is claimed is:

1. A digital map display scrolling method for successively scrolling a displayed portion of a digital map as map information in digital form within a display screen, said method comprising the steps of:

displaying said displayed portion of said digital map at said display screen;

shifting a pointer within said displayed portion of said digital map displayed at said display screen; and scrolling said displayed portion of said digital map at a scrolling speed corresponding to an amount by which said pointer positioned at said displayed portion is shifted within said displayed portion of said digital map.

2. A digital map display scrolling method for successively scrolling a displayed portion of a digital map as map information in digital form within a display screen, said method comprising the steps of:

displaying said displayed portion of said digital map at said display screen;

shifting a pointer within said displayed portion of said digital map displayed at said display screen; and making an amount by which said pointer positioned at said displayed portion is shifted correspond to a scrolling speed of said displayed portion of said digital map within said display screen, wherein a magnitude of said scrolling speed of said displayed portion of said digital map is displayed by a length of an arrow forming said pointer.

3. The digital map display scrolling method of claim 1, further comprising displaying a scrolling direction and a scrolling speed of said displayed portion of said digital map, as a result of arithmetic operations in the vicinity of said pointer within said display screen.

4. The digital map display scrolling method of claim 1, further comprising displaying information of a point at a position of a currently moving cursor, as a result of arithmetic operations in the vicinity of said pointer within said display screen.

5. A digital map display scrolling device for successively scrolling a displayed portion of a digital map as map information in digital form within a display screen, said device comprising:

display means having a display screen, for displaying said displayed portion of said digital map;

pointing means for pointing and shifting a pointer, said means being operated for shifting said pointer within said displayed portion of said digital map displayed at said display screen of said display means; and arithmetic processing means for carrying out arithmetic processing for scrolling said displayed portion of said digital map at a scrolling speed corresponding to an amount by which said pointer is shifted within said displayed portion of said digital map due to operations of said pointing means.

6. A storage medium for storing a digital map display scrolling program for successively scrolling a displayed portion of a digital map as map information in digital form within a display screen, said program comprising the steps of:

displaying said displayed portion of said digital map at said display screen;

shifting a pointer in accordance with operation of pointing means within said displayed portion of said digital map displayed at said display screen; and scrolling said displayed portion of said digital map at a scrolling speed corresponding to an amount by which said pointer is shifted within said displayed portion of said digital map.

7. A digital map display scrolling device for successively scrolling a displayed portion of a digital map as map information in digital form within a display screen, said device comprising:

a display having a display screen for displaying said displayed portion of said digital map;

a mouse for pointing and shifting a pointer, said mouse being operated for shifting said pointer within said displayed portion of said digital map displayed at said display screen of said display; and a processor for carrying out arithmetic processing for scrolling said displayed portion of said digital map at a scrolling speed corresponding to an amount by which said pointer is shifted within said displayed portion of said digital map due to operations of said mouse.

8. A digital map display scrolling device for successively scrolling a displayed portion of a digital map as map information in digital form within a display screen, said device comprising:

display means having a display screen for displaying said displayed portion of said digital map;

pointing means for pointing and shifting a pointer, said means being operated for shifting said pointer within said displayed portion of said digital map displayed at said display screen of said display means; and arithmetic processing means for carrying out arithmetic processing for making an amount by which said pointer is shifted within said displayed portion of said digital map due to operations of said pointing means correspond to a scrolling speed of said displayed portion of said digital map within said display screen, wherein a magnitude of said scrolling speed of said displayed portion of said digital map is displayed by a length of an arrow forming said pointer.

9. The digital map display scrolling device of claim 5, further comprising means for displaying a scrolling direction and a scrolling speed of said displayed portion of said digital map, as a result of arithmetic operations in the vicinity of said pointer within said display screen.

10. The digital map display scrolling device of claim 5, further comprising means for displaying information of a point at a position of a currently moving cursor, as a result of arithmetic operations in the vicinity of said pointer within said display screen.

11. A digital map display scrolling device for successively scrolling a displayed portion of a digital map as map information in digital form within a display screen, said device comprising:

a display having a display screen for displaying said displayed portion of said digital map;

a mouse for pointing and shifting a pointer, said mouse being operated for shifting said pointer within said displayed portion of said digital map displayed at said display screen of said display; and a processor for carrying out arithmetic processing for making an amount by which said pointer is shifted within said displayed portion of said digital map due to operations of said mouse, corresponding to a scrolling speed of said displayed portion of said digital map within said display screen, wherein a magnitude of said scrolling speed of said displayed portion of said digital map is displayed by a length of an arrow forming said pointer.

12. The digital map display scrolling device of claim 7, further comprising means for displaying a scrolling direction and a scrolling speed of said displayed portion of said digital map, as a result of arithmetic operations in the vicinity of said pointer within said display screen.

13. The digital map display scrolling method of claim 7, further comprising displaying information of a point at a position of a currently moving cursor, as a result of arithmetic operations in the vicinity of said pointer within said display screen.

* * * * *